United States Patent [19]
Sukagawa et al.

[11] Patent Number: 5,986,362
[45] Date of Patent: Nov. 16, 1999

[54] MAGNETIC CIRCUIT FOR VOICE COIL MOTOR OF FLAT-COIL TYPE

[75] Inventors: Tomoo Sukagawa, Higashine; Keiji Aruga, Kawasaki, both of Japan

[73] Assignee: Fujitsu Limited, Kawasaki, Japan

[21] Appl. No.: 09/040,169

[22] Filed: Mar. 17, 1998

[30] Foreign Application Priority Data

Aug. 25, 1997 [JP] Japan ................................. 9-228512

[51] Int. Cl.⁶ ............................ H02K 41/02; G11B 33/00
[52] U.S. Cl. ................................................ 310/12; 360/106
[58] Field of Search ............................. 310/12, 13, 14; 360/104, 105, 106

[56] References Cited

U.S. PATENT DOCUMENTS 5,459,362 10/1995 Dunfield et al. .......................... 310/154
5,698,911 12/1997 Dunfield et al. ............................ 310/12

FOREIGN PATENT DOCUMENTS

| 5411411 | 1/1979 | Japan . |
| 2206353 | 8/1990 | Japan . |
| 3052547 | 3/1991 | Japan . |
| 4334961 | 11/1992 | Japan . |
| 5227722 | 9/1993 | Japan . |

*Primary Examiner*—Nestor Ramirez
*Assistant Examiner*—Judson H. Jones
*Attorney, Agent, or Firm*—Greer, Burns & Crain, Ltd.

[57] ABSTRACT

A magnetic circuit for a voice coil motor of flat-coil type used with a magnetic device is disclosed. The magnetic circuit is intended to flatten the torque constant curve for swinging the rotor of the voice coil motor while at the same time preventing the torque constant from decreasing. For this purpose, the magnetic circuit comprises an upper yoke and a lower yoke opposed to a flat coil arranged on the rotor, a pair of side yokes for coupling the upper and lower yokes to each other at the ends thereof, and a magnet arranged on the lower yoke. The magnet is shaped arcuate so that the width in the neighborhood of each end thereof in the direction of motion of the flat coil is larger than a standard width and smaller than the standard width in the portions of the magnet between each end and the central portion thereof.

4 Claims, 8 Drawing Sheets

WIDTH DATA OF THE MAGNET
FOR OBTAINING UNIFORM FLUX

MAGNETIC CIRCUIT FOR VOICE COIL MOTOR OF FLAT-COIL TYPE

BACKGROUND OF THE INVENTION

1. Field of the Invention

The present invention relates to a magnetic circuit for a voice coil motor of a flat-coil type or, in particular, to an improvement in a magnetic circuit for a voice coil motor of a flat-coil type used with a magnetic disk device or the like, comprising a rotor having a flat coil for positioning a head at the desired track on the disk and a magnetic circuit constituting a stator.

2. Description of the Related Art

In recent years, magnetic disk devices have remarkably increased in capacity, making it critical to improve the positioning accuracy of the magnetic head. At the same time, demand has increased for a higher access speed and a lower power consumption, thus giving rise to the necessity of a high-efficiency access motor. The improved recording density, on the other hand, has led to the demand for an efficient voice coil motor of a flat-coil type having a flat torque characteristic which can access the desired track at higher speed.

A conventional magnetic disk device has a bathtub-shaped base housing therein at least a disk rotatable by a spindle motor, a rotor carrying a head for writing or reading a signal into or from the disk, and a voice coil motor for driving the rotor. A cover is applied to the opening of the base.

The cover is made of a single plate and has a surface formed with steps by the pressing technique. The rotational shafts of the rotor and the spindle motor are fixed on the inner face of the cover by screws.

The conventional magnetic disk device also includes a depression, having a hole, formed in the base bottom for fixing the spindle motor. The spindle motor is mounted in the depression, and disks 2 are arranged around the spindle motor.

The voice coil motor mounted at a corner of the base includes a magnetic circuit constituting a stator and a rotor. A head for each recording surface on the disks 2 is mounted at an end of the rotor. A flat coil is interposed between two yokes at the other end of the rotor.

The magnetic circuit includes an upper yoke, a lower yoke, two side yokes for coupling the upper and lower yokes at the ends thereof to each other, a boss for supporting the upper yoke at three points, and a magnet mounted on the lower yoke. The upper and lower yokes are arranged in parallel to each other. The upper and lower yokes are adapted to be placed in an opposed relationship to the flat coil at the above-mentioned other end of the rotor when the voice coil motor is incorporated in the base. A large-diameter portion formed at the central portion of each side yoke functions as a stopper for defining the maximum rotational angle of the rotor.

The magnet is made of a curved flat plate defined by an inner peripheral surface and an outer peripheral surface concentric about the rotational center of the rotor and two radial surfaces. The width between the inner peripheral surface and the outer peripheral surface of the magnet is substantially fixed except for the ends thereof. The magnet is divided into a S pole and a N pole located on the two sides, respectively, of a line passing through the rotational center of the rotor.

The rotor is adapted to swing between the two side yokes with the maximum yawing angle thereof defined by the latter.

The above-mentioned magnet made of a curved flat plate, however, poses the problem that the amount of magnetic flux received, from the magnet, by the flat coil for swinging the rotor is reduced at the ends of the magnet to such an extent that the torque constant curve of the magnetic circuit is not flat with respect to the rotor yawing angle. Specifically, assuming that the yawing angle is zero when the rotor is located at the center of the magnetic circuit, the torque constant sharply declines with the increase in the rotor yawing angle. As a result, different amounts of current are required for the flat coil to swing the rotor by the same angle between when the rotor yawing angle is small and when the rotor yawing angle is large, thereby making it difficult to control the rotation of the rotor.

In view of this, an attempt has been made to flatten the torque constant curve by forming at least a recess by cutting off at least a portion of the outer peripheral surface of the magnet.

In the conventional magnetic circuit for a voice coil motor of flat-coil type with the torque constant curve thereof flattened by forming at least a recess in at least a portion of the outer peripheral surface of the magnet, however, the torque constant that can be actually secured is reduced so that the torque for swinging the rotor is considerably decreased, resulting in a lower peak value of the torque constant. Although the torque constant curve is flattened as compared with a magnet having no such a recess in a portion of the outer peripheral surface, the problem of the conventional magnetic circuit is that an increased amount of current must be inconveniently supplied to the flat coil of the rotor.

SUMMARY OF THE INVENTION

Accordingly, the object of the present invention is to provide a magnetic circuit for a voice coil motor of flat-coil type in which the torque constant curve can be flattened without considerably reducing the torque constant for swinging the rotor.

The present invention is intended to achieve the above-mentioned object and will be explained in the first to the fifth aspects below.

According to a first aspect of the invention, there is provided a magnetic circuit for a voice coil motor of flat-coil type, used with a disk device, having a head arranged at an end of a rotor and able to access a track on a disk-like recording medium, comprising upper and lower yokes arranged in parallel to, and in an opposed relation to, a flat coil at the above-mentioned other end of the rotor, two side yokes for coupling the upper and lower yokes to each other at the two peripheral ends to which the flat coil is adapted to move, and a magnet arranged on at least one of the upper and lower yokes for applying a magnetic force to the flat coil, wherein the neighborhood of each end of the effective portion of the magnet corresponding to the range of motion of the flat coil has a smoothly changing width and is formed wider than the remaining portions thereof with the aim of applying uniform magnetic fluxes to the effective portion of the flat coil passing over the magnet.

According to a second aspect of the invention, there is provided a magnetic circuit, for a voice coil motor of flat-coil type similar to the first aspect, wherein the ends of the magnet are so shaped as to apply a magnetic force also to the outer corners of the linear portions of the flat coil.

According to a third aspect of the invention, there is provided a magnetic circuit, for a voice coil motor of flat-coil type similar to the first aspect, wherein the magnet is made of a curved flat plate defined by two surfaces concentric about the rotational center of the rotor and by two radial surfaces, and wherein the width between the two concentric surfaces of the magnet progressively decreases smoothly from the central portion of the magnet and then progressively increases smoothly toward the ends of the magnet.

According to a fourth aspect of the invention, there is provided a magnetic circuit, for a voice coil motor of flat-coil type similar to the third aspect, wherein the width of the magnet is changed only by the concentric surface thereof farther from the rotational shaft of the rotor.

According to a fifth aspect of the invention, there is provided a magnetic circuit, for a voice coil motor of flat-coil type similar to any of the first to fourth aspects, wherein the width of the magnet is determined in such a manner that the strength of the magnetic flux generated from the curved flat plate is expressed as a vectorial amount in the direction perpendicular to the magnet, that a linear conductor having a length equivalent to the effective portion of the flat coil is moved along the same locus as the flat coil, that the vectorial amount corresponding to the length of the linear conductor is integrated, and that the integral values of the vectorial amount are identical to each other.

According to the present invention, there is provided a magnetic circuit for a voice coil motor of flat-coil type, in which the torque constant curve can be flattened without considerably reducing the torque for swinging the rotor.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of a conventional magnetic disk device shown in FIGS. 1 to 4B.

Figure 1:
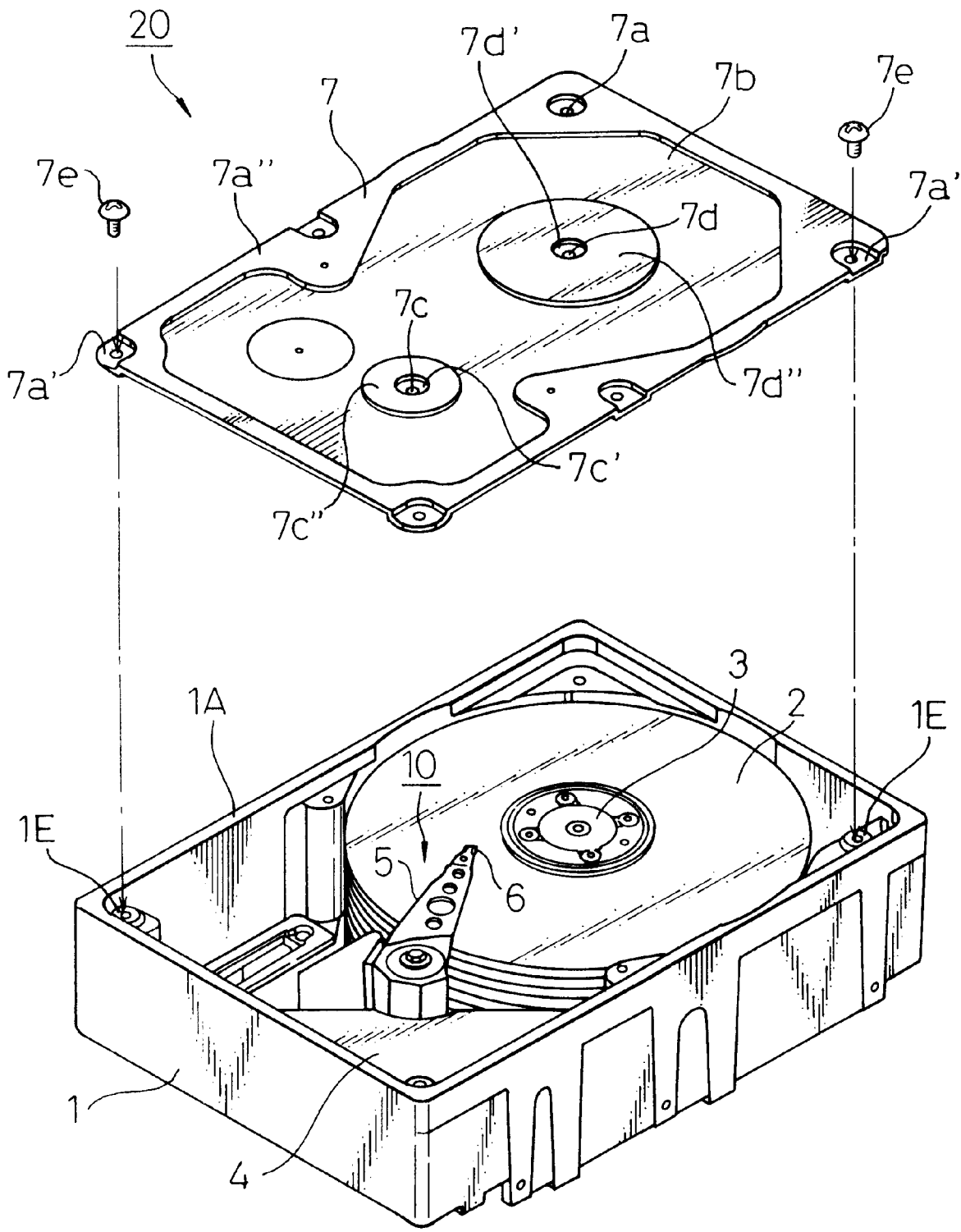
FIG. 1 is a perspective view showing an example configuration of a conventional magnetic disk device.
Figure 2:
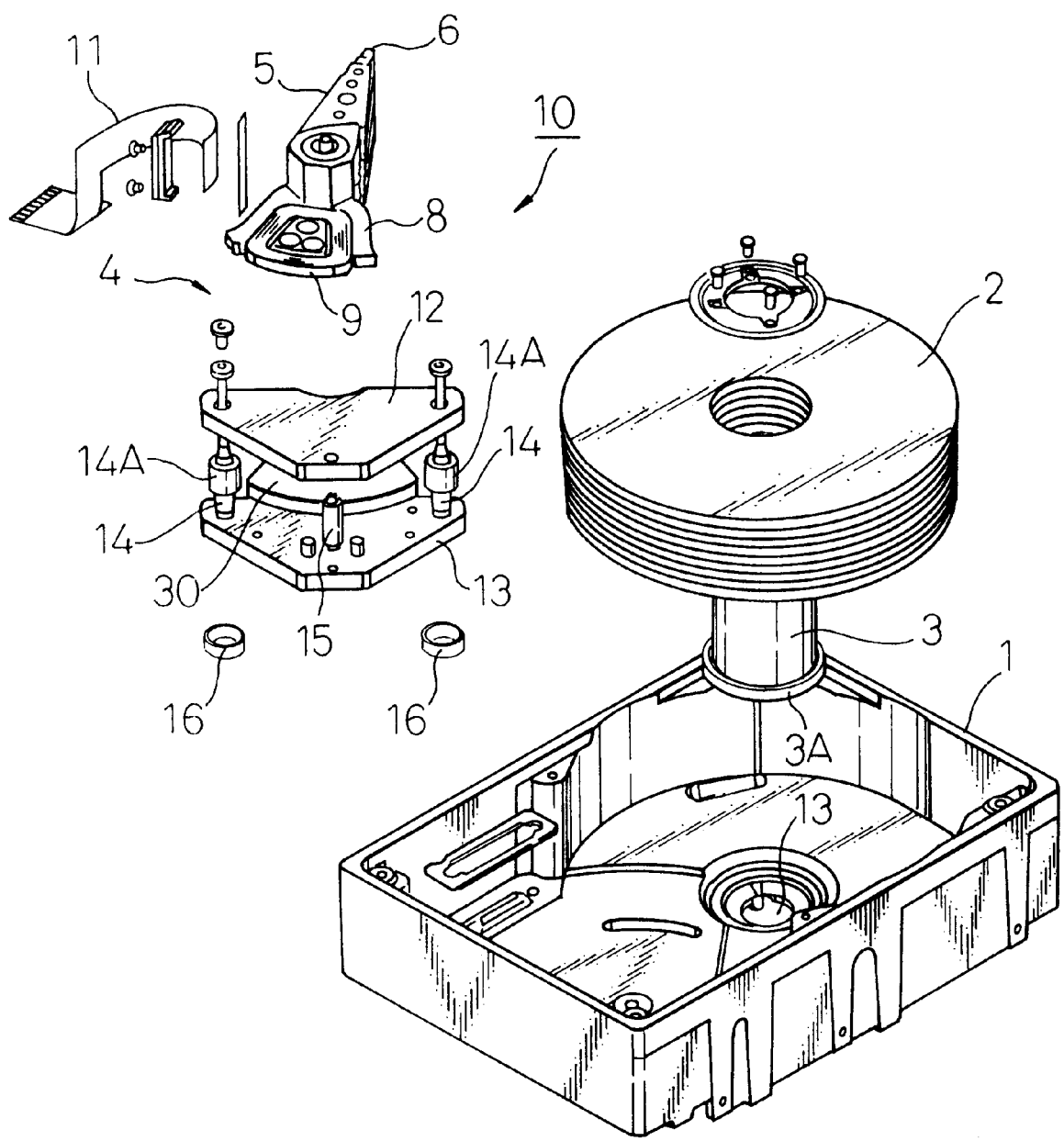
FIG. 2 is an exploded perspective view showing the component elements taken out of the base of the magnetic disk device of FIG. 1.

FIG. 1 is a perspective view taken from above a conventional magnetic disk device 20 with a cover 7 thereof removed. FIG. 2 is an exploded perspective view of the magnetic disk device 20 of FIG. 1 with the members taken out of a base 1 thereof.

As shown in FIGS. 1 and 2, the magnetic disk device 20 comprises a bathtub-type base 1 which has housed therein a plurality of disks 2 rotated by a spindle motor 3 and a voice coil motor 10 including a rotor 5 carrying a head 6 for writing a signal into or reading a signal from the disks 2 and a magnetic circuit 4 constituting a stator for driving the rotor 5.

As shown in FIG. 1, a cover 7 composed of a single solid plate is formed with steps by a pressing technique. Reference numeral 7a designates a threaded hole formed at each of the four corners of the cover 7, numeral 7b a depression, numeral 7c a carriage-fixing hole, and numeral 7d a hole for fixing the spindle motor. The rotor 5 and the spindle motor 3 are fixed on the inner face of the cover 7 by screws not shown. The cover 7 is mounted by way of mounting points 1E by screws 7e. The portions 7a', 7c', 7d' are formed at a lower level than the surface portions 7a", 7c", 7d" of the cover 7 in such positions that the screw heads do not protrude from the cover 7.

The conventional magnetic disk device 20, as shown in FIG. 2, is formed with a spindle motor mounting hole 13 in the bottom of the base 1. The spindle motor 3 is mounted with a flange 3a thereof fitted in this mounting hole 13. A plurality of disks 2 are mounted around the spindle motor 3.

A voice coil motor 10 mounted at a corner of the base 1 includes a magnetic circuit 4 constituting a stator and a rotor 5. A head 6 for each recording surface of the disks 2 is mounted at an end of the rotor 5. A flat coil is interposed between two yokes 8 at the other end of the rotor 5. Numeral 11 designates a flat cable mounted on the side of the rotor 5 for supplying and receiving input/output signals for the head 6, a current for the flat coil 9 and the like, to and from a printed circuit board not shown.

The magnetic circuit 4, on the other hand, includes an upper yoke 12, a lower yoke 13, two side yokes 14 for coupling the two yokes 12, 13 at the ends thereof, a boss 15 for supporting the upper yoke 12 at three points, and a magnet 30 mounted on the lower yoke 13. The upper yoke 12 and the lower yoke 13 are arranged in parallel to each other. When the voice coil motor 10 is built in the base 1 as shown in FIG. 1, the upper yoke 12 and the lower yoke 13 are positioned in an opposed relation to the flat coil 9 arranged at the other end of the rotor 5. Each of the side yokes 14 has a central large-diameter portion 14A which functions as a stopper for defining the maximum rotational angle of the rotor 5. Each large-diameter section 14A has mounted thereon a rubber ring 16 acting as a buffer against the contact with yokes 8 of the rotor 5.

Figure 3A:
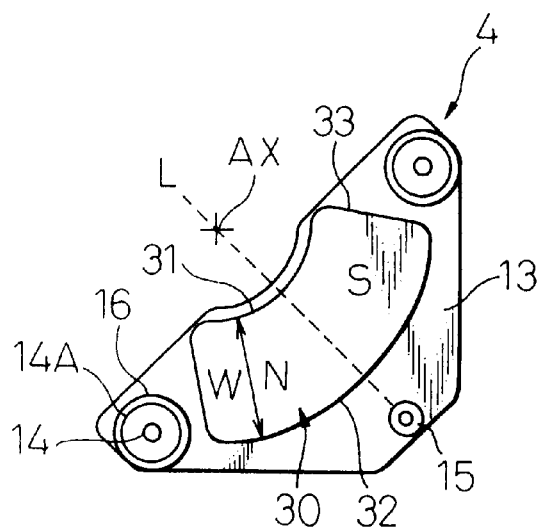
FIG. 3A is a plan view showing relative positions of the magnet and the lower yoke of the conventional magnetic circuit for a voice coil motor of flat-coil type.

FIG. 3A shows the magnetic circuit 4 of FIG. 2 assembled with the upper yoke 12 removed therefrom. In FIG. 3A, numeral 13 designates the lower yoke, numeral 14 the side yokes, numeral 14A the large-diameter portions of the side yokes 14, numeral 15 the boss, numeral 16 the rubber rings, and numeral 30 the magnet. The magnet 30 is a curved flat plate defined by an inner peripheral surface 31 and an outer peripheral surface 32 concentric about the rotational center AX of the rotor and two radial surfaces 33. The width W between the inner peripheral surface 31 and the outer peripheral surface 32 of the magnet 30 is substantially constant except for the ends of the magnet 30. The magnet 30 is separated into a S pole and a N pole on both sides of a line L passing through the rotational center AX of the rotor.

Figure 3B:
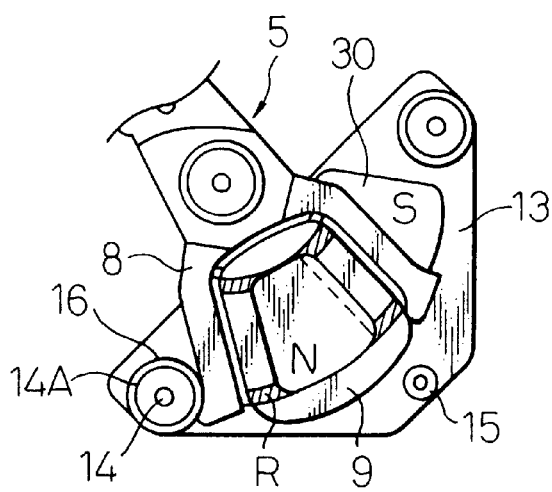
FIG. 3B is a plan view showing relative positions of the magnetic circuit of FIG. 3A and the rotor.

FIG. 3B shows the relation between the lower yoke 13 of FIG. 3A and the rotor 5, with the upper yoke 12 removed. FIG. 3B shows the state in which the rotor 5 is rotated to maximum so that one of the yokes 8 protruded from the rotor 5 is in contact with the rubber ring 16 arranged on the large-diameter portions 14A of one of the side yokes 14. In this way, the rotor 5 can be swung between the two side yokes 14 with the maximum yawing angle thereof defined by the two side yokes 14.

Figure 3C:
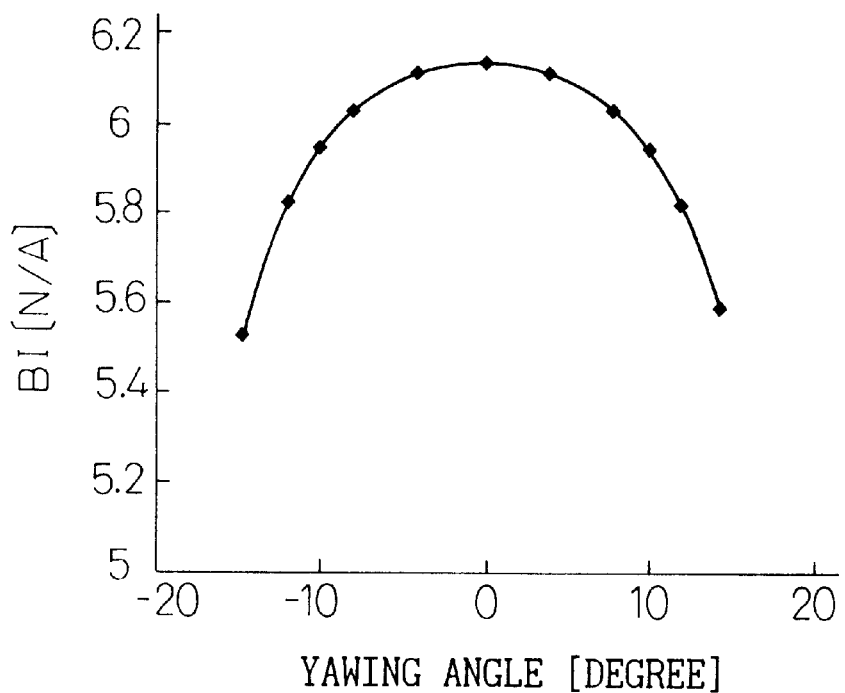
FIG. 3C is a characteristic diagram showing the torque constant applied to the rotor of FIG. 3A with respect to the rotor yawing angle.

In the case where the magnet 30 is in the shape of a curved flat plate as shown in FIG. 3A, the flat coil 9 for swinging the rotor 5 receives a lesser amount of magnetic flux from the ends of the magnet 30 than from the other parts of the magnet 30. Therefore, the torque constant BI (N/A) of the magnetic circuit 4 is not flat with respect to the yawing angle of the rotor 5 but assumes a curve as shown in FIG. 3C. Specifically, on the assumption that the yawing angle is zero when the rotor 5 is at the center of the magnetic circuit 4, the torque constant sharply decreases with the increase in the yawing angle of the rotor 5.

The resulting problem is that the amount of current supplied to the flat coil 9 to swing the rotor by the same degrees of angle is different when the yawing angle of the rotor 5 is small than when it is large, thereby making it difficult to control the rotation of the rotor 5.

Figure 4A:
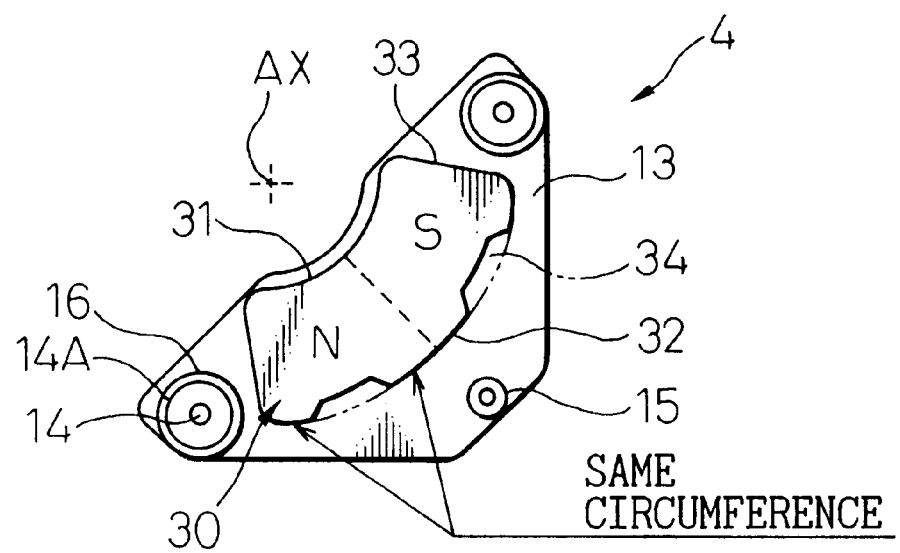
FIG. 4A is a plan view showing relative positions of the magnet and the lower yoke of an improved conventional magnetic circuit for a voice coil motor of flat-coil type.

As shown in FIG. 4A, an attempt has previously been made to flatten the above-mentioned torque constant curve by forming recesses 34 by cutting off portions of the outer peripheral surface 32 of the magnet 30.

Figure 4B:
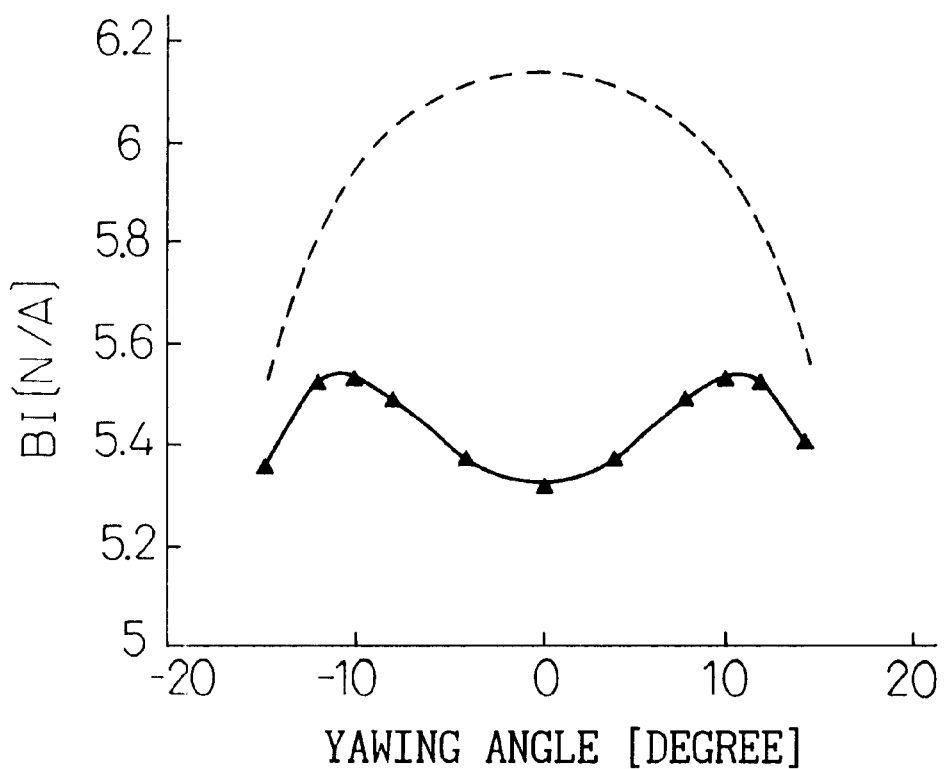
FIG. 4B is a characteristic diagram showing the torque constant applied to the rotor by the magnetic circuit of FIG. 4A with respect to the rotor yawing angle.

In the conventional magnetic circuit of the flat-coil type voice coil motor with the recesses 34 formed in portions of the outer peripheral surface of the magnet 30 as shown in FIG. 4A, however, the torque constant actually obtained assumes a curve as shown by solid line in FIG. 4B. The characteristic represented by the solid line shows that the torque for swinging the rotor 5 is considerably reduced with a lower peak value of the torque constant as compared with the original state shown by dashed line. Consequently, the magnetic circuit shown in FIG. 4A, though having a torque constant curve flattened as compared with that of FIG. 3, encounters the problem of requiring an increased amount of current flowing in the flat coil 9 of the rotor 5 and therefore is not expedient.

Specific examples of the present invention will be described in detail below.

The magnetic circuit for the voice coil motor of flat-coil type according to this invention is used with a voice coil motor 10 operated in a disk device like the conventional disk device 20 explained above with reference to FIGS. 1 and 2. In the embodiments of the invention, therefore, the same component members as those of the conventional voice coil motor 10 are designated by the same reference numerals, respectively.

Figure 5A:
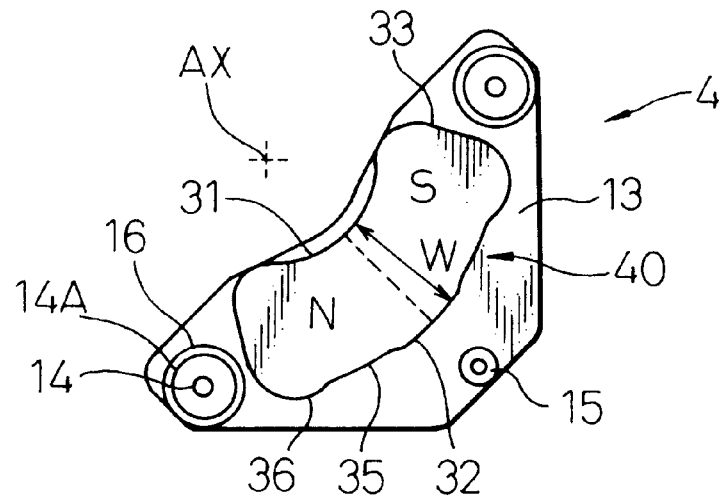
FIG. 5A is a plan view showing relative positions of the magnet and the lower yoke of a magnetic circuit for a voice coil motor of flat-coil type according to the invention.

FIG. 5A is a plan view showing relative positions of the magnet and the lower yoke of the magnetic circuit 4 for a voice coil motor of a flat coil type according to the present invention. FIG. 5A shows the assembled state of the magnetic circuit 4 descried with reference to FIG. 2 in the absence of the upper yoke 12. In FIG. 5A, numeral 13 designates a substantially trapezoidal lower yoke, numeral 14 side yokes protruded at the ends of the lower yoke 12, numeral 14A large-diameter portions of the side yokes 14, numeral 15 a boss for supporting the upper yoke at three points, and numeral 16 a rubber ring mounted around each large-diameter portion 14A. Also in this embodiment, a magnet 40 is arranged on the lower yoke 13.

The magnet 40 in this embodiment is basically made of a curved flat plate defined by an inner peripheral surface 31 and an outer peripheral surface 32 concentric about the rotational center AX of the rotor and two radial surfaces 33. In the prior art, the width W between the inner peripheral surface 31 and the outer peripheral surface 32 of the magnet 40 is substantially the same for all the portions thereof. According to this embodiment, however, the width W between the inner peripheral surface 31 and the outer peripheral surface 32 of the magnet 40 is varied at predetermined different points.

Specifically, in the magnet 40 according to this embodiment, the inner peripheral surface 31 has a circular shape concentric about the rotational center AX of the rotor like in the prior art. Nevertheless, the outer peripheral surface 32, though concentric about the rotational center AX of the rotor in the neighborhood of the center of the magnet 40, includes a pair of recesses 35 smoothly connecting with the concentric portion and a pair of expansions 36 smoothly connecting with the recesses 35, respectively. The shapes of the recesses 35 and the expansions 36 will be explained below.

Figure 6:
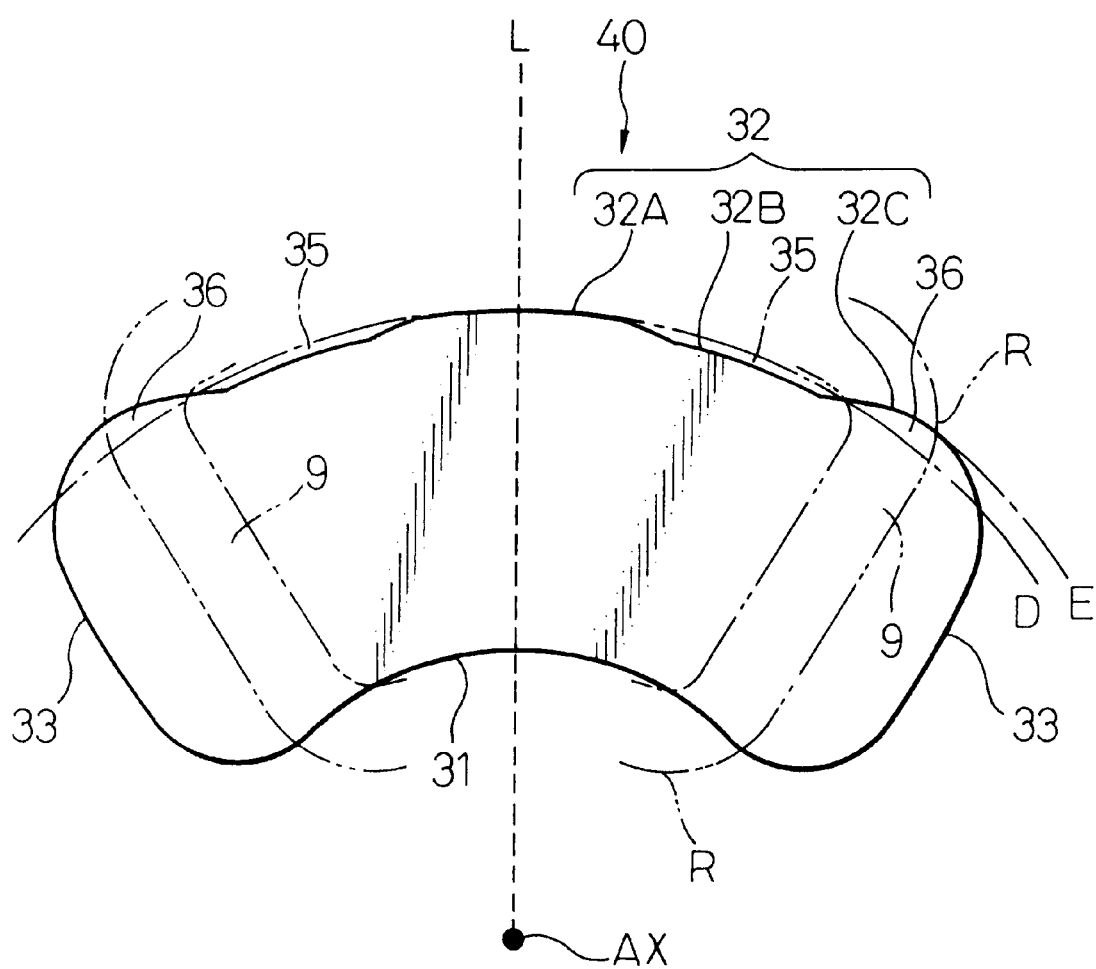
FIG. 6 is a plan view showing in detail the shape of the magnet used with a magnetic circuit according to the invention.

FIG. 6 is a plan view showing in detail the shape of the magnet 40 used with the magnetic circuit 4 according to this embodiment. The magnet 40 according to this embodiment is formed of a curved flat plate symmetric about a straight line L passing through the rotational center AX of the rotor and includes an inner peripheral surface 31, an outer peripheral surface 32 and two radial surfaces 33. The inner peripheral surface 31 forms a part of a cylindrical surface concentric about the rotational center AX of the rotor. The outer peripheral surface 32, on the other hand, is divided into a first outer peripheral surface 32A, a pair of second outer peripheral surfaces 32B and a pair of third outer peripheral surfaces 32C.

The first outer peripheral surface 32A is located in the neighborhood of the straight line L passing through the rotational center AX of the rotor and forms a part of a cylindrical surface conforming with the arc D concentric about the rotational center AX of the rotor. The second outer peripheral surfaces 32B are arranged adjacently to the ends of the first outer peripheral surface 32A, respectively, and have the surfaces thereof located inside of the arc D concentric about the rotational center AX of the rotor, with a recess 35 formed between the arc D and each of the outer peripheral surfaces 32B. The outer peripheral surface 32A and the outer peripheral surfaces 32B are smoothly connected with each other.

A third outer peripheral surface 32C is formed adjacently to each of the second outer peripheral surfaces 32B and has a surface thereof located outside of the arc D concentric about the rotational center AX of the rotor with a pair of expansions 36 formed outward of the arc D. Each of the outer peripheral surfaces 32B is smoothly connected with an associated one of the third outer peripheral surface 32C. Each expansion 36 proceeds progressively away from the arc D with the increase in the rotational angle of the rotor, and after reaching a concentric arc E having a larger radius than the arc D, approaches the arc D again. The expansion 36 comes to coincide with the arc E when the flat coil 9 of the rotor 5 reaches the maximum yawing angle indicated by two-dot chains. At this time point, the largest area of the outer curved portions R of the flat coil 9 is overlapped with the expansion 36.

Figure 5B:
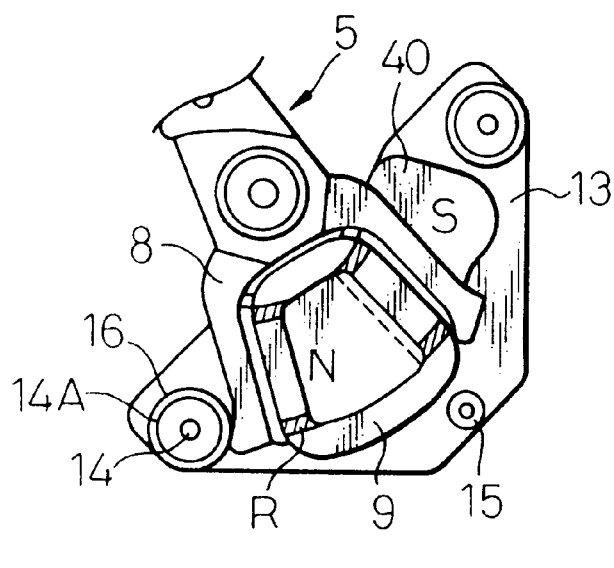
FIG. 5B is a plan view showing the rotor swung to a maximum yawing angle in the magnetic circuit of FIG. 5A.
Figure 5C:
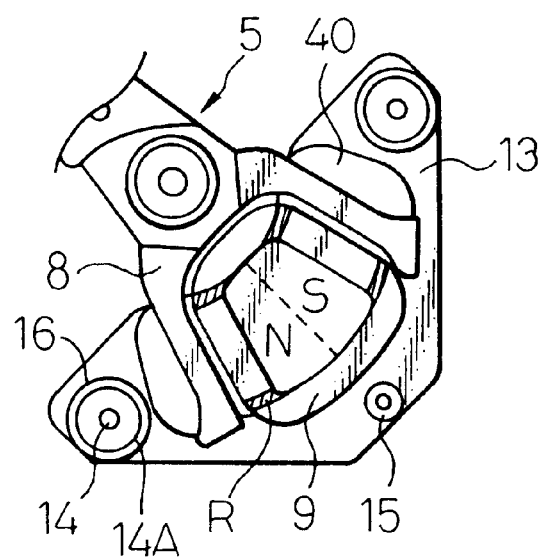
FIG. 5C is a plan view showing the state of the rotor located at the center of the magnetic circuit of FIG. 5A.

With the rotor 5 built in the magnetic circuit 4 having the magnet 40 having the above-mentioned shape, the area of the curved portions R of the flat coil 9 overlapped with the magnet 40 (as indicated by hatching) remains unchanged when the rotor 5 is deflected to maximum, i.e., when the flat coil 9 of the rotor 5 reaches an end of the magnet 40 as shown in FIG. 5B, as compared with when the rotor 5 is located at the central position of the magnet 40 as shown in FIG. 5C.

Also, the area of the curved portions R overlapped with the magnet 40 shown in FIG. 5B is larger than the area of the curved portions R overlapped with the magnet 40 at the same position of the rotor as in FIG. 5B in the conventional magnetic circuit described with reference to FIG. 3. Even in the case where the flat coil 9 of the rotor 5 comes to be located at an end of the magnet 40, therefore, the magnetic fluxes from the magnet 40 pass in a sufficient amount through the curved portions R as well as through the linear portions of the flat coil 9. The torque of the voice coil motor can thus be improved for swinging the rotor 5.

Figure 7A:
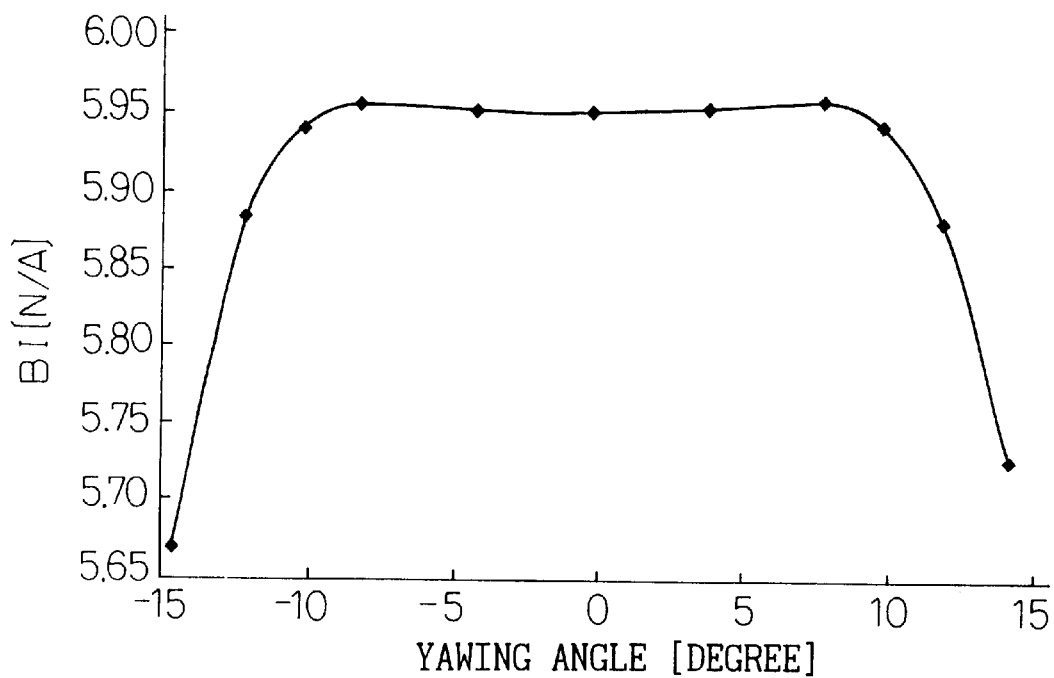
FIG. 7A is a characteristic diagram showing the torque constant applied to the rotor by the magnetic circuit of FIG. 5A with respect to the rotor yawing angle.
Figure 7B:
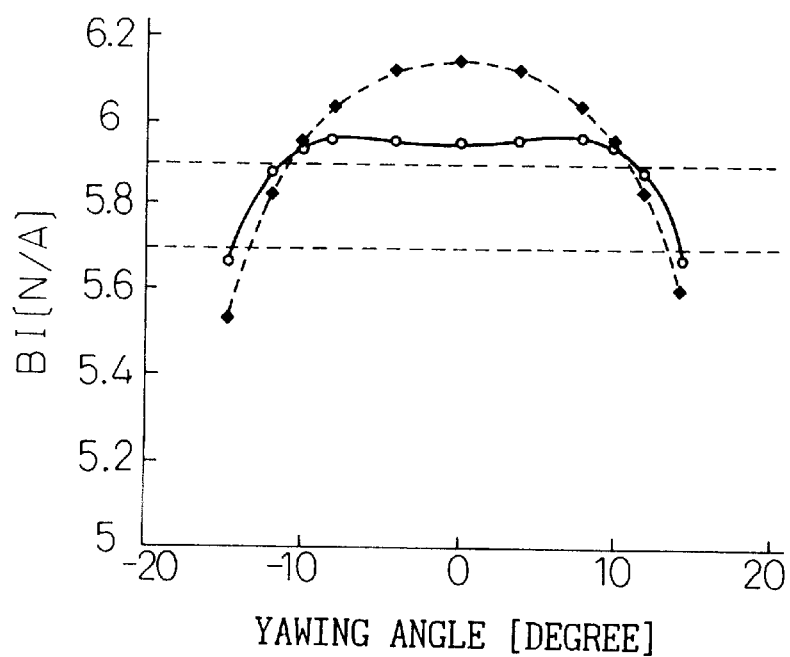
FIG. 7B is a characteristic diagram showing the characteristic of FIG. 7A in comparison with the torque constant applied to the rotor by the conventional magnetic circuit.

FIG. 7A is a characteristic diagram showing the torque constant applied to the rotor by the magnetic circuit of FIG. 5A with respect to the yawing angle of the rotor 5 in an enlarged scale along both the abscissa and the ordinate. FIG. 7B is a characteristic diagram similar to FIG. 7A showing the torque constant applied to the rotor 5 by the conventional magnetic circuit in the same scale along the abscissa and the ordinate as in the characteristic diagram of FIG. 3C. In FIG. 7B, the torque constant applied to the rotor by the conventional magnetic circuit is indicated by dashed line, and the torque constant applied to the rotor by the magnetic circuit according to the present embodiment by solid line.

As can be seen from the characteristic diagrams of FIGS. 7A and 7B, the magnetic circuit 4 for a voice coil motor of flat-coil type using the magnet 40 according to this embodiment can flatten the torque constant curve without considerably reducing the peak value of the torque constant for swinging the rotor 5. As a result, the rotational angle of the rotor 5 can be controlled more easily than in the prior art without increasing the amount of current flowing in the flat cable 9.

Figure 8:
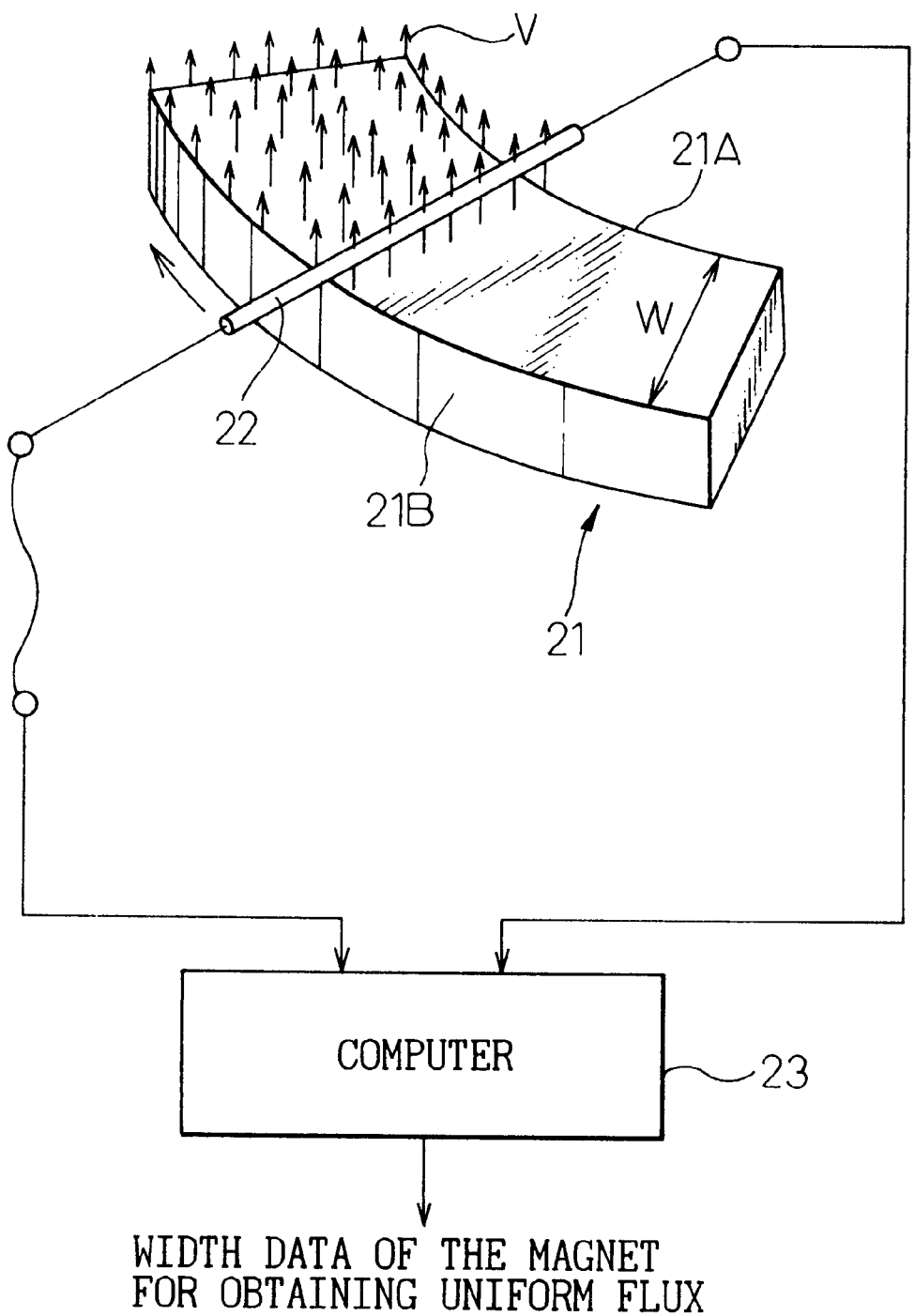
FIG. 8 is a diagram for explaining a method of determining the shape of the magnet used with a magnetic circuit for a voice coil motor of flat-coil type according to the invention.

FIG. 8 is a diagram for explaining an example of a method for determining the shape of the magnet 40 according to the embodiment shown in FIG. 6. In determining the shape of the magnet 40, the strength of the magnetic fluxes released from a curved flat magnet 21 is expressed as a vectorial amount V in the direction perpendicular to the magnet, a linear conductor 22 having a length equivalent to the radial linear portion of the flat coil 9 of the rotor 5 is moved in the direction of arrow along the locus similar to that of the flat coil 9, the vectorial amount V corresponding to the length of the linear conductor 22 is integrated by use of a computer 23, and the width of the magnet 21 is calculated which assures the same integral value of the vectorial amount V at every point. In the process, the width of the central portion or the neighborhood thereof of the magnet 21 is set as a reference width, and the width of each end of the magnet 21 is differentiated upward or downward from the reference width thereby to determine the width of the magnet 21.

The strength of the magnetic fluxes from the magnet 21 is not uniform but progressively decreases toward the edges of the magnet 21. Also, the shape of the outer peripheral surface 21B of the magnet 21 is changed in accordance with the data on the width W of the magnet calculated by the computer 23 at which uniform magnetic fluxes can be obtained, while maintaining the same shape of the inner peripheral surface 21A of the magnet 21. In this way, the magnet 40 according to the present embodiment as described with reference to FIG. 6 is produced.

The shape of the inner peripheral surface 31 of the magnet 40, though cylindrically concentric about the rotational center AX of the rotor 5 in the above-mentioned embodiment, can alternatively be changed at the same time as the shape of the outer peripheral surface 32.

Further, the above-mentioned embodiment concerns the case in which the magnet 40 is arranged only on the lower yoke 13. Instead, the magnet 40 can be arranged on the upper yoke 12 alone or on both the upper yoke 12 and the lower yoke 13.

It will thus be understood from the foregoing description that according to the present invention, there is provided a magnetic circuit for a voice coil motor of flat-coil type, in which uniform magnetic fluxes can be applied to the flat coil of the voice coil motor of flat-coil type according to the shape of the magnet of the magnetic circuit with substantially the same peak value of the torque constant regardless of the yawing angle of the rotor. Therefore, the torque constant curve can be flattened without considerably decreasing the torque constant for swinging the rotor. Consequently, the rotational angle of the rotor can be controlled more easily than in the prior art without increasing the amount of current flowing in the flat cable.

What is claimed is:

1. A magnetic circuit for a voice coil motor of flat-coil type used with a magnetic device for causing a head arranged at a first end of a rotor to access a track on a disk-like recording medium, comprising:

an upper yoke and a lower yoke arranged in parallel opposed relation to a flat coil formed at a second end of said rotor;

a pair of side yokes for coupling said upper and lower yokes to each other at the ends of the side yokes in the peripheral direction along which said flat coil is adapted to move; and a magnet arranged on at least one of said upper and lower yokes for applying a magnetic force to said flat coil;

wherein said magnet is made of a curved flat plate defined by two surfaces concentric about the rotational center of said rotor and by two radial surfaces, and wherein the distance between said two concentric surfaces of said magnet first progressively decreases smoothly from the center of said magnet and then progressively increases smoothly toward each end of the magnet, in order to apply uniform magnetic fluxes to said flat coil passing over said magnet.

2. A magnetic circuit for a voice coil motor of flat-coil type according to claim 1, wherein the ends of said magnet are shaped in such a manner as to apply a magnetic force also to the outer corners of the linear portions of said flat coil.

3. A magnetic circuit for a voice coil motor of a flat coil type according to claim 1, wherein the width of said magnet is changed only by the concentric surface farther from the rotational shaft of said rotor.

4. A magnetic circuit for a voice coil motor of a flat coil type according to any one of claims 1, 2 or 3, wherein the width of said magnet is determined in such a manner that the strength of the magnetic flux released from said curved flat plate is expressed in a vectorial amount in the direction perpendicular to the magnet, that a linear conductor having a length corresponding to the effective portion of said flat coil is moved substantially along the locus of said flat coil, that said vectorial amount equivalent to the length of said linear conductor is integrated, and that the integral value of the vectorial amount is the same at every position.

* * * * *